US009156622B1

(12) United States Patent
Chaon et al.

(10) Patent No.: US 9,156,622 B1
(45) Date of Patent: *Oct. 13, 2015

(54) SWEEP CONVEYOR FOR REMOVAL OF GRAIN AND OTHER MATERIALS FROM BINS

(71) Applicant: Duane Cyril Chaon, Mendota, IL (US)

(72) Inventors: Duane Cyril Chaon, Mendota, IL (US); Patrick William Hughes, Ottawa, IL (US)

(73) Assignee: Duane Cyril Chaon, Mendota, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/288,489

(22) Filed: May 28, 2014

Related U.S. Application Data

(63) Continuation of application No. 13/654,774, filed on Oct. 18, 2012, now Pat. No. 8,770,388.

(60) Provisional application No. 61/548,884, filed on Oct. 19, 2011.

(51) Int. Cl.
*B65G 65/06* (2006.01)
*B65G 19/04* (2006.01)
(Continued)

(52) U.S. Cl.
CPC ............. *B65G 19/08* (2013.01); *B65G 19/04* (2013.01); *B65G 19/22* (2013.01); *B65G 65/06* (2013.01); *B65G 65/425* (2013.01)

(58) Field of Classification Search
CPC ........ B65G 19/04; B65G 19/08; B65G 19/12; B65G 19/22
USPC .................. 198/519, 520, 522, 550.1, 550.4, 198/550.12, 728–734, 735.1, 735.6; 414/309, 327, 306, 322
See application file for complete search history.

(56) References Cited

U.S. PATENT DOCUMENTS

| 1,275,558 A | 8/1918 | Holmgreen |
| 1,338,514 A | 4/1920 | Majerus |

(Continued)

FOREIGN PATENT DOCUMENTS

| FR | 1032110 A | 3/1953 |
| FR | 2 309 442 A1 | 11/1976 |

(Continued)

OTHER PUBLICATIONS

Hutchinson/Mayrath/Terratrack, a Division of Global Industries, Inc., 1012 Series Commercial & Industrial Klean Sweep Augers, Owner's & Operator's Manual, Publication No. 1022480, Dec. 2, 2002.

(Continued)

*Primary Examiner* — Mark A Deuble
(74) *Attorney, Agent, or Firm* — Craig A. Fieschko, Esq.; DeWitt Ross & Stevens S.C.

(57) ABSTRACT

A sweep conveyor extends along a bin floor between a sump pivot about which the conveyor rotates, and an outer end adjacent the bin wall. During the conveyor's orbit about the floor, flights at the conveyor bottom sweep across the floor toward the sump pivot, whereby bin material in front of the conveyor is swept into a sump. The conveyor is preferably made in modular sections connected end-to-end, whereby different sections are combined to construct conveyors having different lengths and capabilities. Some sections are preferably hinged together, allowing different sections to adopt different inclinations as they travel about a non-level floor. The flights are preferably provided on a belted chain riding on sprockets at opposite ends of the conveyor, and the chain is not supported by idler sprockets along its length, allowing the chain (and its flights) to sag under gravity so the flights ride along the bin floor.

25 Claims, 4 Drawing Sheets

(51) Int. Cl.
*B65G 19/08* (2006.01)
*B65G 65/42* (2006.01)
*B65G 19/22* (2006.01)

(56) References Cited

U.S. PATENT DOCUMENTS

| | | | |
|---|---|---|---|
| 1,744,933 | A | 1/1930 | Thoen |
| 1,826,840 | A | 10/1931 | Sylvester |
| 2,445,056 | A | 7/1948 | Cordis |
| 2,529,954 | A | 11/1950 | McCann |
| 2,678,241 | A | 5/1954 | Miller |
| 2,708,504 | A | 5/1955 | Puzey |
| 2,711,814 | A | 6/1955 | McCarthy |
| 2,718,969 | A | 9/1955 | Cordis |
| 2,755,942 | A | 7/1956 | Broberg |
| 2,788,247 | A | 4/1957 | Chapman |
| 2,791,887 | A | 5/1957 | Hennig |
| 2,910,169 | A * | 10/1959 | Russell .............. 198/861.2 |
| 2,933,295 | A | 4/1960 | Rollins |
| 2,963,327 | A | 12/1960 | Seymour et al. |
| 3,071,263 | A | 1/1963 | Bruecker |
| 3,075,657 | A | 1/1963 | Hazen |
| 3,093,110 | A | 6/1963 | Evans |
| 3,193,117 | A | 7/1965 | Best |
| 3,229,665 | A | 1/1966 | Baltz |
| 3,233,755 | A | 2/1966 | Glenn |
| 3,236,399 | A | 2/1966 | Wilkes |
| 3,245,518 | A | 4/1966 | Reibel et al. |
| 3,291,325 | A | 12/1966 | Henningsen |
| 3,295,302 | A | 1/1967 | Lee |
| 3,338,636 | A | 8/1967 | Chapman et al. |
| 3,443,700 | A | 5/1969 | Cymara |
| 3,455,470 | A | 7/1969 | Kanagy et al. |
| 3,472,357 | A | 10/1969 | Strocker |
| 3,487,961 | A | 1/1970 | Neuenschwander |
| 3,519,152 | A | 7/1970 | Broberg |
| 3,536,211 | A | 10/1970 | Martin |
| 3,788,445 | A | 1/1974 | Postel-Vinay |
| 3,794,188 | A | 2/1974 | Denman |
| 3,826,385 | A | 7/1974 | Bluntzer |
| 3,974,908 | A | 8/1976 | Keichinger |
| 3,982,640 | A | 9/1976 | Nauta |
| 4,003,481 | A | 1/1977 | Proctor |
| 4,008,816 | A | 2/1977 | Harrison |
| 4,051,948 | A | 10/1977 | Sackett, Sr. |
| 4,063,654 | A | 12/1977 | Shivvers |
| 4,103,788 | A | 8/1978 | Sutton |
| 4,248,337 | A | 2/1981 | Zimmer |
| 4,248,538 | A | 2/1981 | Sukup |
| 4,352,623 | A | 10/1982 | Smiley |
| 4,378,063 | A | 3/1983 | Silverthorn |
| 4,516,898 | A | 5/1985 | Cantenot |
| 4,585,385 | A | 4/1986 | Buschbom et al. |
| 4,645,403 | A | 2/1987 | DeWit |
| 4,655,666 | A | 4/1987 | Cantenot |
| 4,701,093 | A | 10/1987 | Meyer |
| 4,762,220 | A | 8/1988 | Lutke |
| 4,875,820 | A | 10/1989 | Lepp et al. |
| 5,048,671 | A | 9/1991 | Ellsworth |
| 5,096,048 | A * | 3/1992 | Lachner et al. ............... 198/733 |
| 5,167,318 | A | 12/1992 | Siemens |
| 5,199,549 | A | 4/1993 | Lutke |
| 5,769,590 | A | 6/1998 | Weikel |
| 5,964,566 | A * | 10/1999 | Stewart et al. ................ 414/572 |
| 6,039,647 | A | 3/2000 | Weikel |
| 6,095,742 | A | 8/2000 | Campbell |
| 6,109,425 | A | 8/2000 | Serenkin |
| 6,254,329 | B1 | 7/2001 | Sukup et al. |
| 6,499,930 | B1 | 12/2002 | Dixon |
| 6,948,902 | B2 | 9/2005 | Hanig |
| 7,004,305 | B2 | 2/2006 | Schaefer |
| 7,544,031 | B2 | 6/2009 | Kaeb et al. |
| 7,857,120 | B1 | 12/2010 | Perring et al. |
| 8,770,388 | B1 * | 7/2014 | Chaon et al. ................. 198/728 |
| 8,967,937 | B2 | 3/2015 | Schuelke et al. |
| 2006/0072989 | A1 | 4/2006 | Kaeb et al. |

FOREIGN PATENT DOCUMENTS

| | | |
|---|---|---|
| FR | 2 348 132 A1 | 11/1977 |
| GB | 1 384 347 | 2/1975 |
| GB | 1 404 314 A | 8/1975 |
| GB | 1 431 543 A | 4/1976 |
| JP | 55093737 A | 7/1980 |

OTHER PUBLICATIONS

Koyker Manufacturing Company, Owners Manual, New Daay Bin Paddle Sweep, Manual No. 687988, Jun. 29, 2011.
Sioux Steel, New Daay Bin Paddle Sweep literature, Aug. 19, 2011, 6 pages.
Sioux Steel, Daay Manufacturing, The Chain Drag Sweep, http://daaymfg.com/sweep.html, 9-23-112, 3 pages.
Sioux Steel, New! Daay Bin Paddle Sweep, http://www.siouxsteel.com/index.php/products/category/new-daay-bin-paddle-sweep/, Sep. 23, 2012, 4 pages.

* cited by examiner

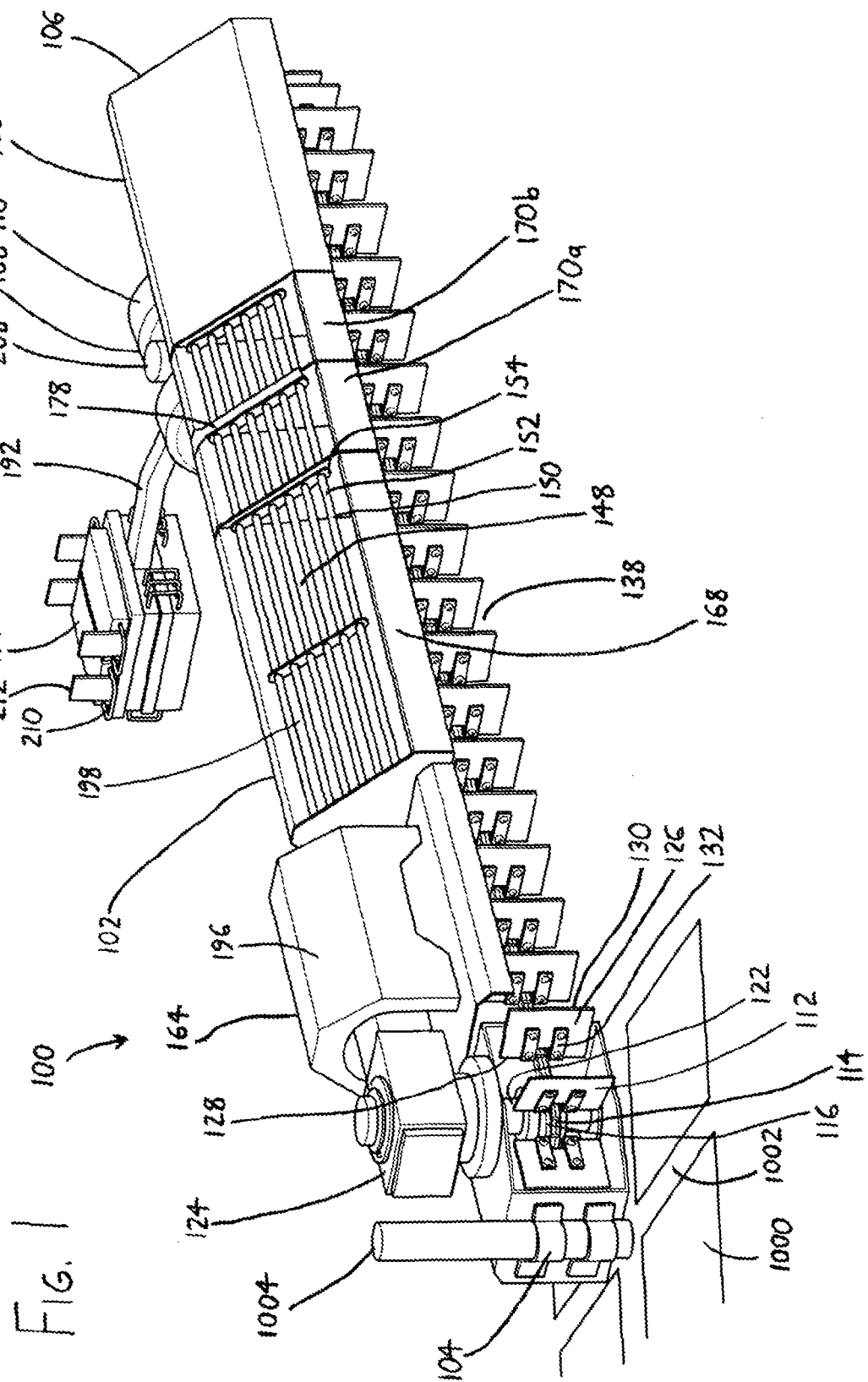

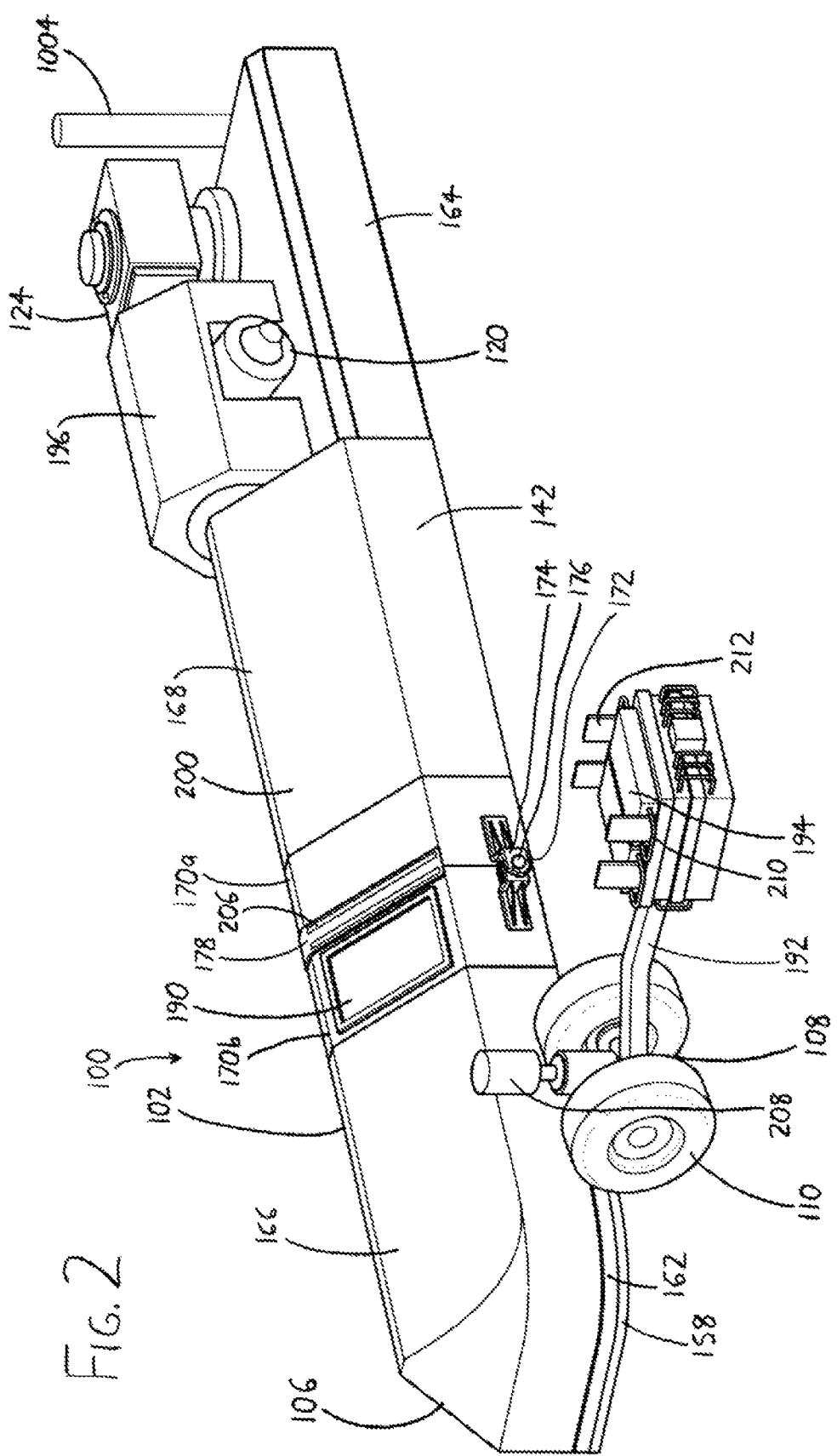

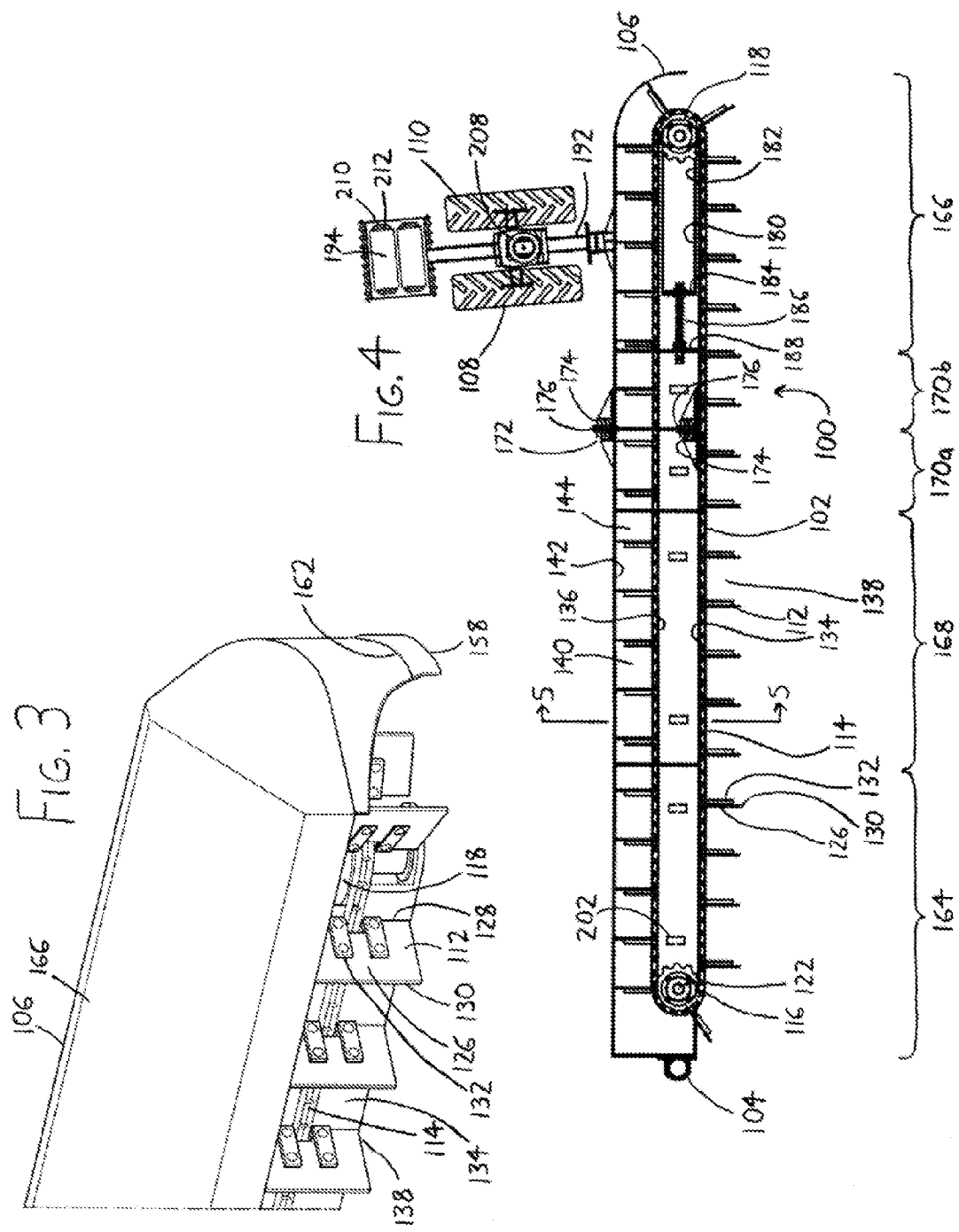

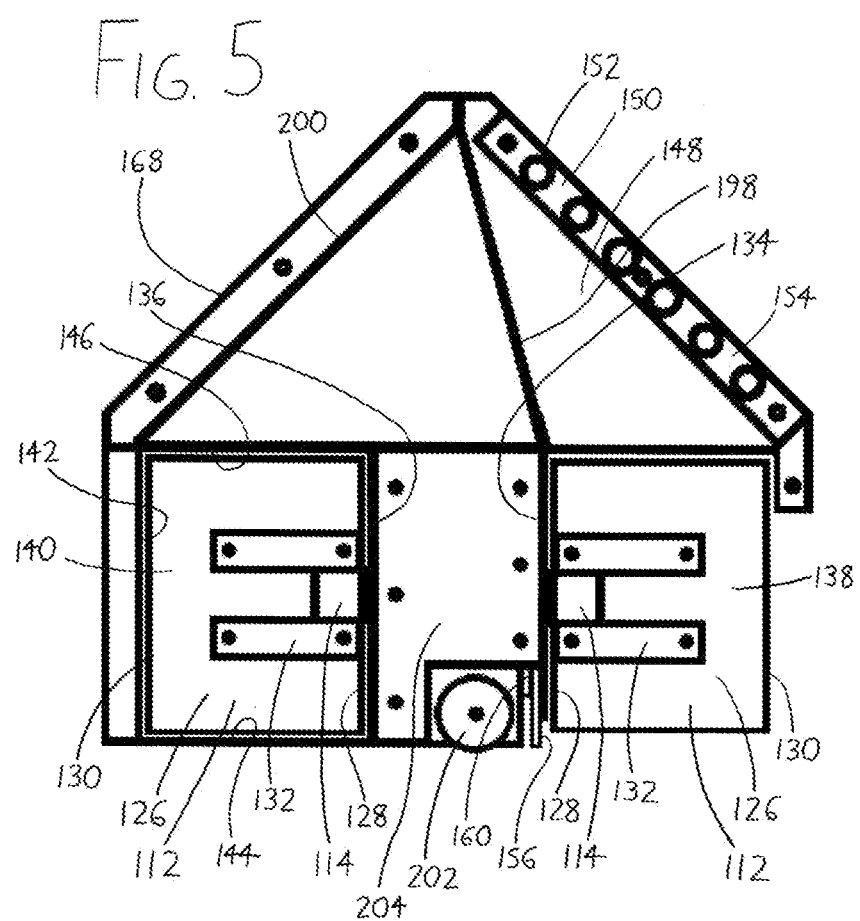

SWEEP CONVEYOR FOR REMOVAL OF GRAIN AND OTHER MATERIALS FROM BINS

CROSS-REFERENCE TO RELATED APPLICATIONS

This application is a continuation under 35 USC §120 of U.S. patent application Ser. No. 13/654,774 filed Oct. 18, 2012 (now U.S. Pat. No. 8,770,388), which in turn claims priority under 35 USC §119(e) to U.S. Provisional Patent Application 61/548,884 filed Oct. 19, 2011. The entireties of these prior applications are incorporated by reference herein.

FIELD OF THE INVENTION

This document concerns an invention relating generally to devices for removing grain and other particulate and/or pulverulent materials from storage bins (silos, tanks, etc.), and more specifically to conveyors used for such purposes.

BACKGROUND OF THE INVENTION

Sweep conveyors are often used to remove grain (wheat, corn, etc.) from grain bins, or otherwise remove loose material from other types of bins (e.g., wood pellets from storage silos, sand or aggregate from holding pens, etc.) The conveyors move about the floor of the bin, typically by rotating about a pivot situated at the bin's center, and engage the material and convey it to a bin outlet, often a sump (pit) leading to a chute or the like from which trucks, rail cars, etc. can receive the material. The conveyors thereby "sweep" the bin and remove the material therefrom. Sweep conveyors of this nature are typically of the screw auger type, wherein a rotating screw engages and conveys the material, or the flighted belt type, wherein flights on a moving belt engage and convey the material (with the flights taking the form of paddles/fins, rakes/tines, or other protrusions which are typically designed to enhance transport of the material being swept). Examples of sweep conveyors of the auger type can be found in (for example) U.S. Pat. No. 4,063,654 to Shivvers; U.S. Pat. No. 4,655,666 to Cantenot; U.S. Pat. No. 4,875,820 to Lepp el al.; U.S. Pat. No. 6,039,647 to Weikel; U.S. Pat. No. 6,095,742 to Campbell; U.S. Pat. No. 6,254,329 to Sukup et al.; U.S. Pat. No. 6,948,902 to Hanig; and U.S. Pat. No. 7,004,305 to Schaefer. Examples of sweep conveyors of the flighted belt type can be found in (for example) U.S. Pat. No. 3,229,665 to Baltz; U.S. Pat. No. 3,338,636 to Chapman el al.; U.S. Pat. No. 3,443,700 to Cymara; U.S. Pat. No. 3,455,470 to Kanagy el al.; U.S. Pat. No. 3,472,357 to Strocker, U.S. Pat. No. 4,516,898 to Cantenot; U.S. Pat. No. 4,762,220 to Lutke; and U.S. Pat. No. 6,499,930 to Dixon.

SUMMARY OF THE INVENTION

The invention, which is defined by the claims set forth at the end of this document, is directed to sweep conveyors which at least partially alleviate problems in the prior sweep conveyors, and/or which otherwise improve on the prior sweep conveyors in one or more respects. A basic understanding of some of the features of exemplary versions of the invention can be attained from a review of the following brief summary of the invention, with more details being provided elsewhere in this document. To assist in the reader's understanding, the following summary occasionally makes reference to selected ones of the accompanying drawings (which are briefly reviewed in the "Brief Description of the Drawings" section following this Summary section of this document), though it should be understood that the noted features may be shown in drawings other than those noted. Since the following discussion is merely a summary, it should be understood that more details regarding the exemplary versions may be found in the Detailed Description set forth elsewhere in this document. The claims set forth at the end of this document then define the various versions of the invention in which exclusive rights are secured.

The drawings (see particularly FIG. 1) illustrate an exemplary sweep conveyor 100 including a conveyor body 102 having a conveyor length extending between a conveyor sump pivot 104 and a conveyor outer end 106. The conveyor body 102 rotates about the conveyor sump pivot 104 as it is driven about the floor of a bin (e.g., a grain bin, not shown), and the conveyor outer end 106 travels next to the wall of the bin (where a circular bin is used) as the conveyor body 102 is rotationally driven. A tractor unit 108, here shown situated at the rear of the conveyor body 102, has wheels 110 which drive against the bin floor to urge the conveyor body 102 forwardly. (Rollers situated below the conveyor body 102, discussed below, can also help support the conveyor body 102 during its travel about the bin.) During the orbit of the sweep conveyor 100 about the bin floor, flights 112 (here shown as paddles/fins) situated at the bottom of the sweep conveyor 100 sweep across the bin floor toward the conveyor sump pivot 104, whereby grain situated within the bin in front of the sweep conveyor 100 is swept into a sump 1000 (which, in a grain bin, is typically a pit having a passage to the outside of the bin). A "spider" 1002—a set of struts—typically supports a stanchion/pin 1004 or other structure above the sump 1000, with the conveyor sump pivot 104 being shown as a bearing rotationally fit about this structure. (The sump 1000, spider 1002, and stanchion 1004 are shown only in FIG. 1 for sake of simplicity.)

The flights 112 travel on an endless belt 114 (depicted as a chain belt) which rides on an inner wheel 116 at or adjacent to the conveyor sump pivot 104, and on an outer wheel 118 (FIG. 3) at or adjacent to the conveyor outer end 106 (with the wheels 116 and 118 being shown as sprockets), with both wheels 116 and 118 being oriented to rotate about at least substantially vertical axes. A motor 120 (FIG. 2) drives the shaft 122 (FIG. 1) of the inner wheel 116 via an intervening gearbox 124. As best seen in FIG. 3, each flight (paddle) 112 is preferably formed of a plate 126 of flexible material (e.g., reinforced rubber) having a length extending horizontally between a flight inner end 128 at which the flight 112 is affixed to the belt 114, and an opposing flight outer end 130. Each flight 112 is affixed to the belt 114 via one or more rigid legs 132 extending outwardly from the (chain) belt 114 near the middle of the flight's height, with the rigid leg(s) 132 extending toward the flight outer end 130 for a major portion of the length of the flight 112. As a result, each flight 112 is rigid for a major portion of its length extending from the flight inner end 128, and is flexible along its flight outer end 130, as well as along its top and bottom. The flights 112 can thereby yield somewhat if they scrape against the floor of the bin, and/or against surrounding portions of the conveyor body 102, while at the same time having sufficient rigidity that they do not buckle under heavy loads of grain.

A forward inner wall 134 (FIG. 3) is situated behind the flights 112 near the bottom front of the conveyor body 102, and a rearward inner wall 136 (FIG. 4) is similarly situated inwardly from the flights 112 at the bottom rear of the conveyor body 102. The belt 114 rides on the inner and outer wheels 116 and 118 about the forward and rearward inner walls 134 and 136, with the space defined in front of the forward inner wall 134 defining a sweep area 138 (FIG. 1) where grain is engaged by the flights 112 and swept toward the sump 1000. The space defined rearwardly of the rearward inner wall 136 defines a return area 140 (FIG. 4) where the flights 112 leaving the sump 1000 travel toward the conveyor outer end 106 to reenter the sweep area 138. The return area 140 is bounded by a rearward outer wall 142 (FIG. 2) spaced from the rearward inner wall 136, such that the flights 112 traveling in the return area 140 have their flight outer ends 130 sweep closely adjacent to (and/or against) the rearward outer wall 142. Preferably, a major portion of the return area 140 from the conveyor sump pivot 104 (FIG. 1) to a location near the conveyor outer end 106 is also bounded at its bottom by a rear floor 144 (FIG. 5) extending between the rearward inner and outer walls 136 and 142 beneath the flights 112, thereby deterring grain that failed to fall into the sump 1000 (FIG. 1) from being redeposited onto the bin floor as the flights 112 travel through the return area 140. A roof 146 (FIG. 5) is also preferably provided over at least the return area 140 for similar reasons.

Chutes 148 (FIG. 1) are defined in the top front of the conveyor body 102 above the sweep area 138 such that grain atop the top front of the conveyor body 102 can fall into the chutes 148, and thereby into the sweep area 138 for removal. Each chute 148 preferably bears a grating 150 which extends forwardly above the sweep area 138, with each grating 150 being shown as a set of parallel spaced bars 152 which extends forwardly above the sweep area 138 (with the spacing between the bars 152 being such that grain can readily fall through the bars 152). The grating bars 152 have endplates 154 at their opposing ends so that the bars 152 can conveniently be installed and removed as a unit for maintenance of the sweep conveyor 100, e.g., to obtain top access to the flights 112 and belt 114. The gratings 150 allow the flights 112 to more speedily remove material when the sweep conveyor 100 is driven into taller piles of material, such as those near the perimeter of a grain bin away from the sump 1000, and/or at the mound of grain that can arise at a location where grain is poured into a bin. The gratings 150 also help to deter large clumps of material from entering the sweep area 138, at which point they can be swept to the sump 1000, where they may clog it. Instead, the bars 152 of the gratings 150 tend to break up such clumps owing to the weight of the grain pressing such clumps against the bars 152, as well as owing to the vibration of the bars 152 during operation of the sweep conveyor 100. Beneficially, the gratings 150 allow grain to pass through the height of the conveyor body 102, reducing the weight of the grain on the conveyor 100 when it rests beneath a pile of grain, and allowing the grain to partially support the conveyor body 102. The gratings 150 additionally provide some degree of safety in case an operator is within a bin during operation of the sweep conveyor 100 (which is not recommended practice), as the bars 152 deter an operator's stepping into the sweep area 138. The illustrated barred configuration for the gratings 150 is preferred, as the bars 152 add stiffness to the conveyor length (particularly when oriented parallel to the conveyor length).

The conveyor body 102 also preferably includes one or more flexible (e.g., reinforced rubber) flanges extending downwardly along the conveyor length below the conveyor body 102, whereby as the conveyor body 102 travels along a floor, the flanges ride along the floor to further sweep and collect grain that was not driven into the sump 1000 by the flights 112. Such "wiper" flanges preferably include flanges 156 (FIG. 5) descending from the forward inner wall 134, i.e., at the rear side of the sweep area 138, as well as flanges 158 (FIG. 2) descending from the rearward outer wall 142 at the conveyor outer end 106 (where the return area 140 lacks a floor at the exit of the return area 140). The flanges 156 and 158 are preferably mounted by sandwiching them against the rear side of the forward inner wall 134, and against the rear side of the rearward outer wall 142, by elongated plates 160 (FIG. 5) and 162 (FIG. 2) which are bolted or otherwise adjustably affixed to these walls 134 and 142. Such an arrangement allows a flange 156/158 to be raised or lowered as desired by loosening the plate 160/162, adjusting the height of the flange 156/158, and then tightening the plate toward the wall 134/142.

The conveyor body 102 is also preferably formed in modular body sections which are adjacently arrayed along the conveyor length, with each body section including a portion of the sweep area 138 (adjacent a portion of the forward inner wall 134), and a portion of the return area 140 (between a portion of the rearward inner wall 136 and a portion of the rearward outer wall 142). Different types and numbers of sections can then be combined to construct sweep conveyors having different lengths and capabilities, and sections can also be easily removed for repair and replacement. As seen in FIGS. 1-2, the sweep conveyor 100 includes five body sections: an inner body section 164 bearing the conveyor sump pivot 104, inner wheel 116, gearbox 124, and motor 120; an outer body section 166 at the conveyor outer end 106, which bears the outer wheel 118; and one longer (e.g., 5-8 ft.) intermediate body section 168 and a pair of shorter (e.g., 2-4 ft.) intermediate body sections 170a and 170b (collectively 170), each of which bears the aforementioned bars 152. These intermediate body sections 168/170 may be provided in different numbers to construct sweep conveyors of different lengths, with a belt 114 being sized to fit about the inner wheel 116 (FIG. 1) of the inner body section 164 and the outer wheel 118 (FIG. 3) of the outer body section 166. An inner body section 164 with an appropriately-sized motor 120 (FIG. 2) can be chosen to drive the belt 114. Different body sections may also be specially configured to meet special objectives, depending on the application for which the sweep conveyor 100 is to be used. For example, in grain bin applications, grain near the bin perimeter tends to clump at the bottom of the bin owing to condensation and possible water ingress into the bin. Thus, it can be beneficial to omit any rear floor 144 (FIG. 5) beneath the return area 140 of the outer body section 166 (see particularly FIG. 3), so that the flights 112 in both the sweep and return areas 138 and 140 of the outer body section 166 can scrape at clumped material to better remove it from the bin.

While adjacent body sections can simply be bolted or otherwise affixed together, at least some of the adjacent body sections are preferably hingedly connected such that they may pivot with respect to each other in vertical planes (i.e., adjacent body sections can deviate from the horizontal plane). This arrangement allows the conveyor body 102 to flex along its length if different body sections encounter different floor heights. In FIGS. 2 and 4, a hinge 172 is situated between the shorter intermediate body sections 170a and 170b, such that the shorter intermediate body sections 170a and 170b in combination might be regarded as a hinged body section 170 which flexes along its length. The hinge 172 includes a set of hinge plates 174 connected to the rearward outer walls 142 of the body sections 170a and 170b outside the return area 140, as seen in FIGS. 2 and 4, with the hinge plates 174 being pivotally pinned together; and a similar set of hinge plates 174 connected to the forward inner walls 134 of the body sections between the forward and rearward inner walls 134 and 136, as seen only in FIG. 4, with the hinge plates 176 being pivotally pinned together. These hinge plates 174 are shown in the form of sets of ears extending from each of the shorter body sections 170a and 170b to rest in parallel adjacent relationship, with a pair of ears on each shorter body section 170a and 170b receiving an ear of the other shorter body section therebetween, and with a pin 176 extending between the ears to pivotally fix them together. Away from the hinge 172, the shorter body sections 170a and 170b have sufficient space between their adjacent ends that the hinge 172 allows (for example) as much as five degrees of variation of one of the body sections 170a and 170b with respect to the other. The hinge 172 may also (or alternatively) include lengths of flexible barrier material joined between the body sections 170a and 170b, with FIGS. 1-2 illustrating a rubber strip 178 which extends between the adjacent ends of the body sections 170a and 170b from their top rear sides to their top front sides (with plates 206, FIG. 2, and 154, FIG. 1, sandwiching the strip 178 against the end of each body section 170a and 170b). The barrier material 178 helps avoid the passage of grain through the space between the adjacent ends of the body sections 170a and 170b, while at the same time also allowing pivoting between the body sections 170a and 170b.

To allow adjustment of the tension of the belt 114 bearing the flights 112, at least one of the body sections bearing one of the belt-carrying wheels bears a tensioner which carries one of the wheels thereon, and which is movable along the conveyor length to adjust the tension in the belt 114. FIG. 4 illustrates a tensioner 180 formed as an elongated rectangular box or beam fit between the forward and rearward inner walls 134 and 136 of the outer body section 166, and having a tensioner wheel end 182 bearing the outer wheel 118, and an opposing tensioner adjustment end 184. A screw 186 extends between and engages the tensioner 180 and the outer body section 166 (at a threaded aperture on a bridge 188 extending between the forward and rearward inner walls 134 and 136 of the outer body section 166). By turning the end of the screw 186 (which can be accessed from the door 190 situated at the top rear side of the adjacent shorter intermediate body section 170b), the tensioner 180 (and thus the outer wheel 118) is urged along the length of the outer body section 166, thereby allowing modification of the tension of the flight-bearing belt 114.

As best seen in FIGS. 2 and 4, the tractor unit 108 is shown situated on a tractor arm 192 extending from the rearward outer wall 142 of the outer body section 166, though the tractor unit 108 could be situated on other body sections instead (and/or additional tractor units 108 can be situated on other body sections). Preferably, at least one tractor unit 108 is situated along the conveyor length at a location closer to the conveyor outer end 106 than the conveyor sump pivot 104, since tractor units 108 situated closer to the conveyor outer end 106 can more efficiently drive the conveyor body 102 forwardly. The tractor unit 108 is preferably connected to the conveyor body 102 to pivot about an axis oriented at least substantially perpendicularly to the conveyor length, as by providing a bearing along the tractor arm 192. Such an arrangement better allows both wheels 110 of the tractor unit 108 to remain on (and drive against) the bin floor when the floor is not level. To provide the tractor unit 108 with better traction on the floor, it may be weighted, with FIGS. 1-2 and 4 showing a set of weights 194 situated atop the tractor unit 108 (with these weights 194 being removable and replaceable so that a user may weight the tractor unit 108 as desired).

Further advantages, features, and objects of the invention will be apparent from the remainder of this document in conjunction with the associated drawings.

BRIEF DESCRIPTION OF THE DRAWINGS

FIG. 1 is a front perspective view of an exemplary sweep conveyor 100 as discussed above, with the sweep conveyor 100 rotating about the conveyor sump pivot 104 on the bin floor (not shown), and with its flights 112 sweeping inwardly toward the sump 1000 such that grain encountered during the travel of the conveyor 100 is swept into the sump 1000.

FIG. 2 is a rear perspective view of the sweep conveyor 100 shown without the sump 1000 of FIG. 1.

FIG. 3 is a front perspective view of the outer end 106 of the outer body section 160 of the sweep conveyor 100 of FIGS. 1-2.

FIG. 4 is a simplified schematic top cross-sectional view of the sweep conveyor 100 of FIGS. 1-3 taken along a horizontal plane situated approximately halfway up the heights of the flights 112, but schematically illustrating the tractor unit 108 from its top (without sectioning).

FIG. 5 is a simplified schematic cross-sectional view of the longer intermediate body section 168 of the sweep conveyor 100 of FIGS. 1-3, taken along the vertical plane 5-5 illustrated in FIG. 4.

DETAILED DESCRIPTION OF PREFERRED VERSIONS OF THE INVENTION

Expanding on the discussion above, the conveyor body 102 will typically rest on the floor of a grain bin or the like, and will often be wholly or partially buried in grain poured atop it within the bin. The conveyor body 102 is driven by the tractor unit 108 to rotate (in a clockwise direction in FIG. 1) about the conveyor sump pivot 104. During such rotation, the motor 120 (FIG. 2) drives the inner wheel 116 (FIG. 1), and thus the belt 114 and flights 112 thereon, so that the flights 112 in the sweep area 138 are driven inwardly toward the sump 1000. Grain can enter the sweep area 138 both from the bottom front of the conveyor body 102 (i.e., in front of the flights 112 as the conveyor body 102 is driven forwardly by the tractor 108), and also by falling into the chutes 148 defined beneath the bars 152 in the intermediate body sections 168, 170a, and 170b, to be swept by the flights 112 into the sump 1000. The flange 156 (FIG. 5) situated at the bottom of the forward inner wall 134, and the flange 158 (FIGS. 2-3) at the rearward outer wall 142 of the outer body section 166, assist in collecting any residual grain that isn't swept by the flights 112. As the conveyor body 102 travels about the bin floor, it can navigate over uneven or otherwise irregular areas of the floor (owing to settling, non-level concrete pouring, floor features such as aeration tunnels, etc.), and effectively sweep grain despite such irregularities, owing to the flexibility in the perimeters of the flights 112, and owing to the pivotally-connected body sections 170a and 170b. The bottom edges of the flights 112 bend in a squeegee-like fashion as they run across the bin floor, and the flexure between the hinged intermediate body sections 170a and 170b allows adjacent sections of the conveyor body 102 to tilt with respect to each other along the conveyor length. The use of one or more hinged body sections 170 (i.e., a pair of hingedly connected body sections 170a and 170b) is particularly useful to accommodate floor irregularities: since a conveyor body 102 will typically be assembled to extend 30-70 feet in length (though lesser or greater lengths are possible), a rigid conveyor body 102 might result in the flights 112 passing over low areas on the floor, thereby leaving grain behind, and/or the portions of the conveyor body 102 might "hang up" on high areas and be unable to move. Moreover, the weight of the grain in a full bin could cause undesirable stress over a conveyor body 102 having a rigid conveyor length. Beneficially, the sweep conveyor 100 depicted in the drawings has a very low center of gravity, which helps deter tipping or twisting of the conveyor body 102 along its length when it is buried in grain, and/or when it encounters irregular grain loading along its conveyor length.

At the inner body section 164, the motor 120 (FIG. 2) and/or gearbox 124 are appropriately chosen to provide the desired output when driving the flights 112 (FIG. 1). The motor 120 is covered by a hinged shield 196 so that when the sweep conveyor 100 is buried in grain, the motor 120 is less likely to overheat. The motor 120 is preferably a variable frequency electric motor which is controlled to operate at an appropriate speed by a programmable logic control or other controller, though other types of motors can be used (e.g., hydraulic or other non-electric motors may be useful where totally spark-free operation is desirable, such as when the sweep conveyor 100 is used to sweep ignitable powders, though "XP-rated"—i.e., explosion-proof—electric motors will generally be suitable). Preferably, the controller monitors the speed and torque of the motor 120 and tractor unit(s) 108 to obtain a measure of grain removal, and adjusts the power supplied to each to attain a desired rate of removal. For example, if the output of the motor 120 indicates increasing torque and decreasing speed (indicating that the motor 120, and its associated belt 114 and flights 112, are beginning to "strain" to achieve grain removal), the tractor unit(s) 108 might be paused or slowed until the burden on the flights 112 decreases. As another example, if the output of the motor 120 is such that stalling of the flights 112 (e.g., from plugging of the sweep area 138 and/or the return area 140, FIG. 4) is indicated, the tractor unit(s) 108 may be stopped, and the controller may attempt to drive the motor 120 (and possibly the tractor unit(s) 108) in reverse for a period to see if the stalling can be resolved. It is notable that the ability to independently alter the speeds of the belt/flight motor 120 and the tractor unit(s) 108, and/or adjust the speed of one in at least partial dependence on the operating state of the other, avoids many of the drawbacks that arise where the grain-conveying drive and the floor-traveling drive of a sweep conveyor are always running together, as is common in prior sweep conveyors. For example, in many prior sweeps, when the grain-conveying drive encounters a large load of grain, it is necessary to use jacks or other lifts to lift the wheels of the floor-traveling drive off the floor to slow or halt their driving action. Otherwise, the grain-conveying drive may overload as the floor-traveling drive continues to push the sweep conveyor into the grain before the grain-conveying drive adjusts to the load.

Additional sensors may supply feedback regarding the level of grain and/or grain flow in the sump 1000, the temperature of the motor 120, the position of the sweep conveyor 100 about the bin floor, and other factors. Ideally, the sweep conveyor 100 may be entirely monitored and controlled at a remote station outside the grain bin, so that a "zero bin entry" system is provided.

Within the inner body section 164, the shaft 122 (FIG. 1) of the inner wheel 116 is supported at its opposing ends by high-strength bearings to deter deflection of the shaft 122. While not depicted in the drawings, the rearward outer wall 142 (FIG. 2) adjacent the inner wheel 116 (FIG. 1) preferably curves to closely follow the path followed by the flight outer ends 130 to better avoid a "dead area" where grain might collect. It is notable that the use of the inner and outer wheels 116 and 118 to support the flight-bearing belt 114, without the use of intermediate "idler" wheels, allows the belt 114 to sag somewhat (if appropriately tensioned). As a result, the flights 112 can drag across the floor in the sweep area 138, allowing more thorough removal of grain.

The longer intermediate body section 168, as best seen in FIG. 1 and in the cross-sectional view of FIG. 5, has its forward inner wall 134 continue upwardly at a slight angle to the peak of the longer intermediate body section 168, thereby defining a rear chute wall 198 which directs any grain falling thereon through the bars 152 of the grating 150 toward the sweep area 138 (shown occupied by a flight 112 in FIG. 5, as with the return area 140 between the rearward inner wall 136, the rearward outer wall 142, the rear floor 144, and the roof 146). A sloped conveyor body rear top wall 200 extends from the peak to the rearward outer wall 142 to better direct grain avalanching over the conveyor body 102 toward the rear of the sweep conveyor 100. As noted previously, rollers can be situated at the bottom of the conveyor body 102 to help support it during its travel about the bin, and one such roller 202 is depicted within the space 204 between the forward and rearward inner walls 134 and 136. Rollers of this nature, which are preferably made of steel, can be situated at the bottom of each conveyor section between the forward and rearward inner walls 134 and 136, with the rollers 202 being oriented to roll along planes oriented generally perpendicular to the conveyor length. These rollers 202 preferably have adjustable height, as by supporting their central shafts on screws (not shown), such that the clearance of the bottom of each conveyor section over the bin floor is adjustable. Typically, it is preferable to have the rollers 202 support each conveyor section so that the section is as close as possible to the bin floor, typically by no more than a quarter to a half an inch. FIG. 5 also depicts the aforementioned flexible flange 156, which helps collect grain which is not swept out of the sweep area 138. The flange 156 is sandwiched against the rear side of the forward inner wall 134 by an elongated plate 160, with bolts (not shown) extending through the plate 160 and flange 156 to engage the forward inner wall 134.

The shorter intermediate body sections 170a and 170b are generally constructed similarly to the longer intermediate body section 168, save for their shorter length, and save for the (optional) hinge 172 connecting them. If a hinge 172 is included, it is preferably provided on both the rearward outer walls 142 of the adjacent body sections outside the return area 140, as well as on the forward inner walls 134 of the adjacent body sections between the forward and rearward inner walls 134 and 136, as with the hinges 172 seen in FIG. 5. The barrier strip 178 "sealing" the seam defined between the hingedly connected body sections 170a and 170b is preferably formed of rubber or another elastomer, though a strong fabric (e.g., durable canvas) or other suitably flexible material may be used instead. The strip 178 extends upwardly across the rear top walls 200 of the shorter body sections 170a and 170b (against which the strip 178 is sandwiched by the plates 206) to extend over, and be folded about, the front side edges of the shorter body sections 170a and 170b. The barrier material 178 is there held in place by the gratings 150 of the shorter body sections, whose endplates 154 sandwich the barrier material 178 against the abutting walls of the shorter body sections 170a and 170b. The strip 178 can therefore be removed and replaced when needed by unbolting the plates 206 from the rear top walls 200, and by unbolting the grating endplates 154 from the walls.

The outer body section 166, which bears the outer wheel 118 carrying the flight-bearing belt 114, includes the aforementioned tensioner 180 for adjusting the tension of the belt 114 (e.g., for tightening the belt 114 when it stretches after a period of use). As previously noted, the tensioner 180 is shown in FIG. 4 as a rectangular box closely and slidably fit within the space between the forward and rearward inner walls 134 and 136 of the outer body section 166 (and between the floor 144 and roof 146 of this space as well). The tensioner wheel end 182 defines a yoke wherein the outer wheel 118 is rotatably mounted between bearings, and the opposing tensioner adjustment end 184 bears a threaded aperture which receives the screw 186. The end of the screw 186 is then rotatably mounted in a bearing or the like on the bridge 188 extending between the forward and rearward inner walls 134 and 136 of the outer body section 166. A user may therefore access the end of the screw 186 via the access door 190 at the rear top wall 200 of the adjacent shorter body section 170*b*, and turn the screw 186 to drive the tensioner 180 (and thus the outer wheel 118) along the conveyor length to attain the desired tension in the flight-bearing belt 114. (Such an access door 190, or at least the aperture thereof, is preferably provided near one or more ends of each body section 164, 166, 168, and 170*a*/170*b* to allow maintenance access to the interior of the body section, but the door may be welded shut—or its aperture simply omitted—where no such access is needed.)

The tractor 108, which extends from the rear of the outer body section 166 on the tractor arm 192, is preferably pivotable about the axis of the tractor arm 192 so that the tractor 108 can better accommodate floor unevenness. As seen in FIG. 5, the tractor arm 192 preferably does not extend perpendicularly from the conveyor length, or more precisely, the axes of rotation of the wheels 110 do not extend parallel to the conveyor length, and are rather oriented at an angle to the perpendicular (or to the conveyor length), as this has been found to provide better traction. A high-torque electric motor 208 is controlled by the controller for the sweep conveyor 100 to drive the wheels 110 of the tractor unit 108. The tractor arm 192 extends rearwardly from the motor 120 and wheels 110 to support the removable weights 194, which are depicted as plates having U-shaped handles 210 at their ends. The weights 194 are mounted on the tractor arm 192 by inserting legs 212 extending from the tractor arm 192 into the U-shaped handles 210, thereby holding the weights 194 firmly in place on the tractor arm 192 even when the tractor 108 drives forwardly when buried under grain.

The walls, ceilings, floors, etc. of the various body sections 164, 166, 168, and 170*a*/170*b* are preferably made of metal sheets/panels, e.g., 0.1-0.5 inch thick hot-rolled steel, with flanges and other reinforcing structures being formed to add strength along larger unsupported areas, or at areas experiencing greater stress.

Power is preferably supplied to the sweep conveyor 100 via lines extending upwardly within the stanchion 1004, and leading to the sweep conveyor 100 and its belt motor 120, tractor motor(s) 208, etc., via appropriate rotary power transmission couplings (e.g., electrical slip rings, hydraulic rotating unions, etc.).

An exemplary sweep conveyor 100 is shown in the drawings and described above to illustrate a possible configuration and features of the invention. However, sweep conveyors in accordance with the invention can be presented in forms which differ significantly from the form of the exemplary sweep conveyor 100 shown in the drawings and described above, with different sizes, proportions, components, etc., and the functions and operation of the sweep conveyor 100 can also vary from those described above. Following is a brief review of exemplary modifications that can be made.

While the function and operation of the sweep conveyor 100 is frequently described above in relation to removal of grain from a grain bin, the sweep conveyor 100 can be used for removal of other materials from other types of bins, e.g., removal of animal feed from feed storage tanks, removal of coal from coal cribs, etc.

The sweep conveyor 100 is described as rotating about a sump pivot 104 on a bin floor, but with appropriate modification, it can sweep along non-rotary paths. For example, if the sump pivot 104 is removed and one or more tractors 108 are installed to apply a driving force along the entire conveyor length, the sweep conveyor 100 can be made to sweep along a linear path. To illustrate, the sweep conveyor 100 might be installed to rest parallel to a wall of a rectangular bin, with the ends of the conveyor length being configured to ride along rails mounted on the adjacent walls of the bin, and the sweep conveyor 100 can be driven along the rails to sweep linearly across the floor of the bin.

As noted previously, the sweep conveyor 100 may include numbers, orders, and types of body sections other than those shown (e.g., more or fewer longer and shorter intermediate body sections 168 and 170*a*/170*b* might be incorporated in the depicted sweep conveyor 100). Hinges 172 may be incorporated between body sections where desired, and need not necessarily be provided only between shorter intermediate body sections 170*a*/170*b* (though providing hinges 172 between adjacent shorter intermediate body sections 170*a*/170*b* is useful to generate a hinge body section 170 that can then be installed along the conveyor length as needed). One or more tractors 108 may be provided on body sections other than the outer body section 166 to provide driving force as desired.

Body sections may also be configured significantly differently from those shown. As examples, they need not have a pentagonal peaked cross-section (as seen in FIG. 5), and could (for example) omit the sloped conveyor body rear top wall 200, and instead have a single forwardly-sloping chute wall 198 extending from the rearward outer wall 142 to the rearward inner wall 136. The external tractors 108 might be omitted, and the rollers at the bottom of the conveyor body 102 between the forward inner wall 134 and the rearward inner wall 136 could be motorized to drive the conveyor body 102 (though the external tractors 108 are preferred).

The conveyor sump pivot 104 need not take the form of a bearing fit about a stanchion 206, and could instead (for example) take the form of a descending stanchion which fits into a bearing. While not depicted in the drawings, it is useful to provide a relatively low-friction disc (e.g., of ultra-high molecular weight PET) between the bearing 104 and the sump spider 1002, and/or a low-friction plate at the bottom of the inner body section 164, to reduce friction and possible metal-on-metal contact between the inner body section 164 and the sump spider 1002.

The sump pivot 104 also need not be situated at an end of the conveyor length: body sections may be situated on opposing sides of the inner body section 164 (or more particularly on opposing sides of the conveyor sump pivot 104), such that the conveyor length straddles the sump 1000. In this case the flighted belt 114 might ride on the inner wheel 116 and two outer wheels 118, one at each end of the conveyor length. (Or the motor 120 and inner wheel 116 could be situated at one end of the conveyor length, and the outer wheel 118 could be situated across the sump 1000 at the opposite end of the conveyor length, perhaps with one or more idler wheels 110 being situated at or near the sump 1000.) On opposite sides of the sump pivot 104, the sweep and return areas 138 and 140 would exchange locations so that the sweep area 138 at each side of the sump 1000 is always driven forwardly about the bin floor, with the return area 140 trailing. Such a sweep conveyor could, for example, extend across the entire diameter of a grain bin, and could beneficially remove grain from opposing sides of the grain bin at the same time, thereby avoiding the stresses on the bin walls that can arise from unbalanced loading. An alternative to this arrangement is to simply take two independent sweep conveyors (such as two of the sweep conveyors 100 as seen in FIGS. 1-2) and mount them about a common conveyor sump pivot 104. A particularly preferred alternative version of the sweep conveyor 100 has portions of its conveyor length on opposing sides of the sump 1000, with a length extending the full radius of the grain bin on one side of the sump 1000 (i.e., extending from the sump pivot 104 to the bin wall), and a length extending approximately half the radius of the grain bin on the opposite side of the sump 1000. A single belt 114 drives the flights 112 across the conveyor length, with the belt 114 being driven by a single motor 120 situated on the shorter side of the sweep conveyor 100 (preferably on the outer body section situated at the end of the shorter side of the sweep conveyor 100). Such a sweep conveyor helps to avoid the aforementioned bin wall stresses owing to unbalanced unloading of the grain bin, while only requiring a motor 120 of moderate power, size, and price. In contrast, a sweep conveyor 100 extending the full diameter of the bin typically requires a more significant motor 120 to drive the belt 114 across the entire bin diameter.

While the belt 114 and inner and outer wheels 116 and 118 are depicted as a chain and sprockets, these could take different forms, e.g., the belt 114 may assume the form of a band or cable, and the wheels 116 and 118 may assume the form of rollers (for driving the band) or pulleys (for driving the cable).

A chute 148 (preferably with an upper grating 150) could also be provided on the outer body section 166, with the chute 148 preferably being spaced some distance away from the conveyor outer end 106 so that the chute 148 does not open above the region where the flights 112 are still traveling to the front of the conveyor body 102. The grating 150 need not take the form of parallel bars 152, and could (for example) take the form of bars 152 defining a mesh. The bars 152 need not be round, and could (for example) be slat-like, preferably oriented to present a narrow edge at the top of the chute 148 to better break up any clumps of material.

The tensioner 180 can operate to adjust the location of the outer wheel 118 along the conveyor body 102 by mechanisms other than a screw 186, e.g., via a ratcheting mechanism, or via a piston or other member driven by a spring (or via hydraulics, pneumatics, etc.) to apply tension. Alternatively, the wheel-bearing tensioner 180 might simply be moved to a desired location which yields the desired tension in the belt 114, and might then be bolted, wedged, or otherwise affixed in place.

Apart from the foregoing features, the sweep conveyor 100 might incorporate features found in one or more of the patents listed near the beginning of this document, and/or in patents cited in (or citing to) these patents.

In summary, the sweep conveyors encompassed by this patent are not limited to the various versions described above, but rather are limited only by the claims set out below. Thus, this patent encompasses all different versions of the sweep conveyor that fall literally or equivalently within the scope of these claims.

What is claimed is:

1. A sweep conveyor including:
   a. a conveyor body having a conveyor length extending between opposing conveyor first and second ends;
   b. a pair of wheels including:
      (1) an inner wheel at or adjacent to the conveyor first end, and
      (2) an outer wheel at or adjacent to the conveyor second end;
   c. an endless belt riding on the inner and outer wheels;
   d. flights spaced along the belt, each flight having a length protruding from the belt between:
      (1) a flight inner end at which the flight is affixed to the belt, and
      (2) an opposing flight outer end;
   e. a roof extending over a first set of the flights; and
   f. a grating extending:
      (1) from the roof, and
      (2) over a second set of the flights, whereby material falling through the grating falls between the flights.

2. The sweep conveyor of claim 1 wherein:
   a. the conveyor body is formed of two or more body sections adjacently arrayed end-to-end along the conveyor length,
   b. the body sections include:
      (1) an inner body section:
         (a) situated at or adjacent to the conveyor first end, and
         (b) wherein the inner wheel is situated on the inner body section;
      (2) an outer body section:
         (a) situated at or adjacent to the conveyor second end,
         (b) wherein the outer wheel is situated on the outer body section, and
         (c) wherein the flights spaced along the belt riding on the outer wheel are exposed from both the front and the bottom of the outer body section;
      (3) at least one intermediate body section situated between the inner body section and the outer body section.

3. The sweep conveyor of claim 2 wherein:
   a. the inner wheel is movably situated on the inner body section, and/or
   b. the outer wheel is movably situated on the outer body section,
   whereby moving the inner or outer wheel adjusts the distance between the inner and outer wheels, and thereby adjusts tension in the belt thereon.

4. The sweep conveyor of claim 2:
   a. further including a forward inner wall extending along the conveyor length, wherein:
      (1) a space defined forwardly of the forward inner wall defines a sweep area, and
      (2) a space defined rearwardly of the sweep area defines a return area;
   b. wherein at least one of the body sections includes:
      (1) at least a portion of the roof, and
      (2) at least a portion of the grating.

5. The sweep conveyor of claim 4 wherein the roof further extends over at least a portion of the sweep area.

6. The sweep conveyor of claim 1 wherein the grating is defined by spaced bars.

7. The sweep conveyor of claim 1:
   a. further including a forward inner wall extending along the conveyor length, wherein:
      (1) a space defined forwardly of the forward inner wall defines a sweep area, and
      (2) a space defined rearwardly of the sweep area defines a return area;
   b. wherein the roof extends over a portion of the sweep area, and
   c. wherein the grating also extends over a portion of the sweep area, with the roof and grating being adjacently situated along the conveyor length.

8. The sweep conveyor of claim 1 further including:
a. a forward inner wall extending along the conveyor length, wherein:
   (1) a space defined forwardly of the forward inner wall defines a sweep area at which the flights are exposed from both the front and the bottom of the sweep conveyor, and
   (2) a space defined rearwardly of the sweep area defines a return area;
b. a rearward inner wall extending along the conveyor length,
c. a rearward outer wall extending along the conveyor length, wherein the return area is situated between the rearward inner and outer walls, and
d. a rear floor extending between the rearward inner and outer walls beneath the return area.

9. The sweep conveyor of claim 1 further including a flexible flange extending downwardly below the conveyor body along the conveyor length, whereby as the conveyor body travels along a floor, the flange rides along the floor.

10. The sweep conveyor of claim 9:
a. further including a forward inner wall extending along the conveyor length, wherein:
   (1) a space defined forwardly of the forward inner wall defines a sweep area, and
   (2) a space defined rearwardly of the sweep area defines a return area;
b. wherein the flexible flange descends from the forward inner wall.

11. The sweep conveyor of claim 9 further including:
a. a rearward outer wall extending along the conveyor-length rearwardly of the belt and the flights thereon, and
b. an elongated plate sandwiching the flexible flange against the rearward outer wall.

12. The sweep conveyor of claim 1:
a. further including:
   (1) a forward inner wall extending along the conveyor length, wherein:
      i. a space defined forwardly of the forward inner wall defines a sweep area, and
      ii. a space defined rearwardly of the sweep area defines a return area;
   (2) a rearward inner wall extending along the conveyor length, wherein the rearward inner wall forwardly bounds the return area;
b. wherein the conveyor body is formed of two or more body sections adjacently arrayed along the conveyor length, each of the body sections including:
   (1) a portion of the forward inner wall, and
   (2) a portion of the rearward inner wall,
b. one of the body sections bears a tensioner translatably received between the forward and rearward inner walls, wherein the tensioner bears one of the inner and outer wheels thereon.

13. The sweep conveyor of claim 12 wherein a screw extends between and engages:
a. the body section bearing the tensioner, and
b. the tensioner,
whereby rotation of the screw adjusts the location of the tensioner relative to the body section bearing the tensioner.

14. The sweep conveyor of claim 12 wherein the tensioner extends between:
a. a tensioner wheel end bearing one of the inner and outer wheels, and
b. an opposing tensioner adjustment end having a screw extending therefrom, the screw being rotatably mounted with respect or one or more of the forward and rearward inner walls of the body section bearing the tensioner.

15. The sweep conveyor of claim 1 wherein each flight is:
a. rigid for a major portion of its length extending from the flight inner end, and
b. flexible for a portion of its length extending from the flight outer end.

16. The sweep conveyor of claim 1 wherein each flight:
a. is formed of a plate of flexible material, and
b. is fixed to a rigid leg extending outwardly from the belt, the rigid leg extending for a major portion of the flight's length extending from the flight inner end.

17. The sweep conveyor of claim 1 wherein at least one of the inner and outer wheels is movable along the conveyor length, whereby one or more of the wheels adjusts the tension in the belt thereon.

18. A sweep conveyor including:
a. a conveyor body having:
   (1) a conveyor length extending between opposing conveyor first and second ends,
   (2) conveyor front and rear sides extending along the conveyor length,
   (3) a sweep area defined along the conveyor front side,
   (4) a grating atop at least a portion of the conveyor front side, and over the sweep area,
   (5) a return area extending along the conveyor length rearwardly of the sweep area, and
   (6) a roof atop at least a portion of the conveyor rear side, and over the return area;
b. inner and outer wheels oriented to rotate about at least substantially vertical axes, wherein:
   (1) the inner wheel is situated closer to the conveyor first end than to the conveyor second end, and
   (2) the outer wheel is situated closer to the conveyor second end than to the conveyor first end;
c. an endless belt riding on the inner and outer wheels;
d. flights spaced along the belt and within the sweep and return areas, each flight having a length extending from the belt between:
   (1) a flight inner end at which the flight is affixed to the belt, and
   (2) an opposing flight outer end.

19. The sweep conveyor of claim 18 wherein:
a. the conveyor body is formed of two or more body sections adjacently situated along the conveyor length, and
b. at least two adjacent body sections are hingedly connected, whereby the hingedly connected body sections pivot with respect to each other in vertical planes.

20. A sweep conveyor including:
a. a conveyor body:
   (1) having a conveyor length extending between opposing conveyor first and second ends,
   (2) having a forward inner wall extending along the conveyor length, wherein:
      i. a space defined forwardly of the forward inner wall defines a sweep area, and
      ii. a space defined rearwardly of the sweep area defines a return area;
   (3) wherein the conveyor body is formed of two or more body sections adjacently situated along the conveyor length, each of the body sections including a portion of the forward inner wall,
   (4) at least two adjacent body sections are hingedly connected, whereby the hingedly connected body sections may pivot with respect to each other in vertical planes, b. a pair of wheels oriented to rotate about at least substantially vertical axes, the wheels including:
   (1) an inner wheel at or adjacent to the conveyor first end, and
   (2) an outer wheel at or adjacent to the conveyor second end;
c. an endless belt riding:
   (1) on the inner and outer wheels, and
   (2) around the forward inner wall;
d. flights spaced along the belt and within the sweep and return areas, each flight having a length protruding from the belt between:
   (1) a flight inner end at which the flight is affixed to the belt, and
   (2) an opposing flight outer end.

21. The sweep conveyor of claim 20 further including a rearward inner wall extending along the conveyor length, wherein:
   a. the rearward inner wall forwardly bounds the return area, and
   b. each of the body sections includes a portion of the rearward inner wall.

22. The sweep conveyor of claim 20 wherein the hingedly connected body sections include lengths of flexible barrier material joined between the hingedly connected body sections.

23. The sweep conveyor of claim 21 wherein:
   a. the walls extending along the conveyor length further include a rearward outer wall rearwardly bounding the return area, and
   b. the hingedly connected body sections include:
      (1) a set of hinge plates connected to the rearward outer walls of the body sections outside the return area, the hinge plates being pivotally pinned together, and
      (2) a set of hinge plates connected to the forward inner walls of the body sections outside the sweep area, the hinge plates being pivotally pinned together.

24. The sweep conveyor of claim 23 wherein each set of hinge plates defines three or more adjacent ears with a pin extending therebetween.

25. The sweep conveyor of claim 20 wherein the conveyor body includes:
   a. a roof extending the sweep area, and
   b. a grating extending adjacent the roof and above the sweep area.

* * * * *